Aug. 24, 1965  G. M. STEINER  3,202,079
QUICK RELEASE VENTILATORS
Filed April 15, 1963  3 Sheets-Sheet 1

INVENTOR.
GEORGE M. STEINER
BY
Oldham & Oldham
ATTYS.

INVENTOR.
GEORGE M. STEINER
BY Oldham & Oldham
ATTYS.

Aug. 24, 1965  G. M. STEINER  3,202,079
QUICK RELEASE VENTILATORS
Filed April 15, 1963  3 Sheets-Sheet 3

INVENTOR.
GEORGE M. STEINER
BY
ATTYS

United States Patent Office 3,202,079
Patented Aug. 24, 1965

3,202,079
QUICK RELEASE VENTILATORS
George M. Steiner, Akron, Ohio, assignor to Burt Mfg. Co., Akron, Ohio, a corporation of Ohio
Filed Apr. 15, 1963, Ser. No. 273,155
4 Claims. (Cl. 98—42)

This invention relates to ventilating dampers for buildings, particularly factories, and is concerned with quick release mechanism for fully opening the dampers in the event of a fire.

It is the general object of the invention to provide efficient, substantially fool-proof, easily-operated mechanism for simultaneously releasing for inside or outside of a building a long row of ventilating dampers for movement to a fully opened position in the event of a fire.

Another object of the invention is to provide a long row of a plurality of dampers in a factory building or the like wherein the dampers can be moved to and from a closed to an adjustably opened position, but with release mechanism being built into the damper moving means in such manner that all damper moving means can be instantly released to allow damper movement to an open position by means of gravity forces.

Another object of the invention is the provision of a combination wherein clutch means connect a motor to each damper operating means, mechanical linkage connects the clutch means together for simultaneous operation, resilient means bias the mechanical linkage tending to move each clutch means to open position, means releasable from the building roof holding the clutch means closed, and means releasable from inside the building holding the clutch means closed.

Another object of the invention is the provision of improved, less expensive, faster operated and more efficient quick release mechanism for building dampers and readily operated from inside or outside of the building in the event of a fire.

Another object of the invention is provision of apparatus of the character described in which the quick release mechanism can be readily reset so as to allow the normal damper moving mechanism to operate.

The foregoing objects of the invention and other objects which will become apparent as the description proceeds, are achieved by providing the combination in a large damper assembly adapted to be positioned in long runs on top of a building roof of a substantially rectangular damper frame, a plurality of dampers pivotally mounted in the frame on horizontal axes positioned slightly off center so that each damper will move by gravity to a substantially vertical open position, rack and gear means for moving each damper to an adjusted or closed substantially horizontal position, a plurality of shafts mounting the gear means, a motor, a gear reducer connected to the motor and to the plurality of shafts, a clutch between each shaft and the gear reducer, mechanical linkage connecting the clutches for simultaneous operation, spring means biasing the linkage and tending to open all clutches, a bar pivotally secured to one end of the linkage, a flexible strand means secured to one end of the bar and adapted to extend to the roof and be releasably anchored there, and a second flexible strand means secured to the other end of the bar and adapted to extend to the inside of the building and be releasably anchored there whereby release of either strand means disengages all clutches and causes all dampers to move to open position by gravity.

For a better understanding of the invention reference should be had to the accompanying drawings, wherein.

Figure 1:
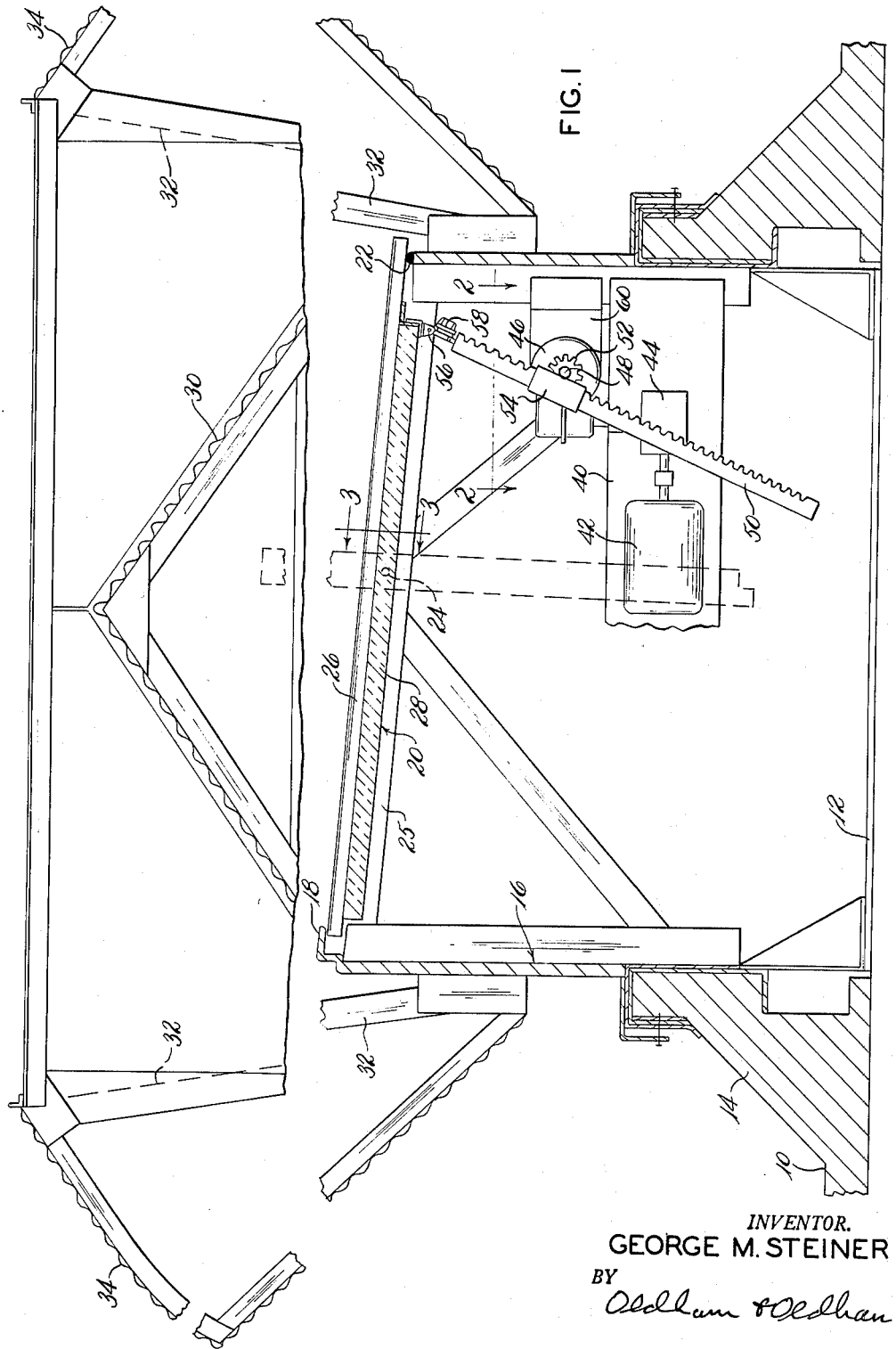
FIGURE 1 is a vertical transverse sectional view through a typical damper installation on top of a building and incorporating the principles of the invention.

In FIGURE 1, the numeral 10 indicates a roof formed with a ventilator opening 12 therein with a built up flange 14 normally surrounding the opening 12. In a typical installation, the opening 12 may be some four feet wide and substantially any desired number of feet long, for example eighty eight feet long on the flat top of a building, typically a factory building. Built into the opening 12 is a substantially rectangularly, box-like structure, sometimes called an airshaft, normally made up from sheet metal and supported with appropriate angle iron members and sheet metal flanges, the details of which form no part of the present invention. Suffice it to say that the frame or airshaft asembly indicated as a whole by the numeral 16 fits down into the roof opening 12 and is formed with an overhanging flange 18 adapted to engage with the top longitudinal edge at one side of a damper 20, the other side longitudinal edge of the damper 20 engaging with a suitable seal 22 carried at the edge of the frame 16.

Figure 3:
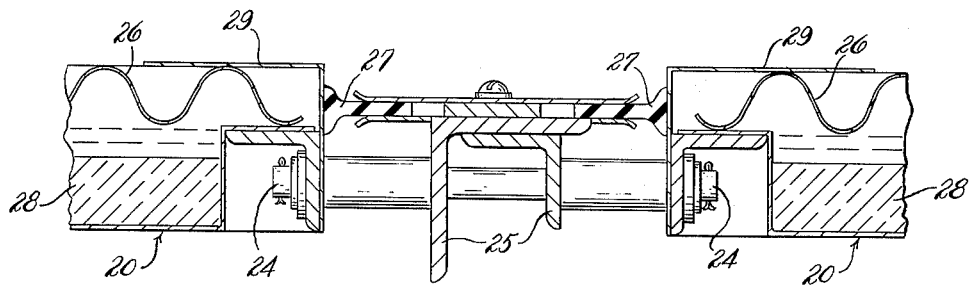
FIGURE 3 is an enlarged fragmentary view taken on line 3—3 of FIGURE 1 and showing the pivotal support means for the dampers.
Figure 4:
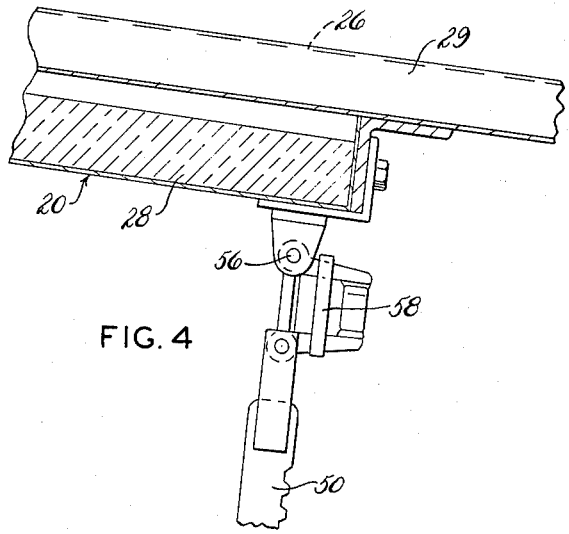
FIGURE 4 is an enlarged fragmentary view of the fusible links associated with the assembly.

Each damper 20 is pivotally mounted for rotary movement on substantially horizontal pivots 24 positioned slightly off center of the dampers 20 so that if the damper 20 is left free it will rotate by gravity around its pivotal supports 24 to the vertical dotted line position shown in FIGURE 1. The pivotal supports 24 are carried in angles 25 (see FIG. 3) extending crossways of the frame assembly 16 at the ends of the dampers. Flexible seals 27 are provided between the ends of the dampers and the angles 25.

The damper 20 in one form includes a corrugated metal outer surface 26 and insulating inner liner 28, the assembly being surrounded by a sheet metal frame 29. The damper 20 is typically made eight feet long so that a number of these dampers will be mounted substantially end to end per FIG. 3 in the elongated frame assembly 16 having dimensions such as previously stated along the roof of a building.

Positioned above all dampers 20 is a corrugated metal roof 30 supported upon uprights 32 to further keep rain or snow from the dampers, but with the roof 30 being spaced a sufficient distance vertically above the dampers so as to not interfere with the movement thereof from full line to dotted line position. Completing the assembly are curved side or wind break panels 34 likewise mounted on the vertical uprights 32 to keep rain and snow from blowing in sideways beneath the roof 30 of the ventilator assembly.

Mounted about midway of the row of dampers 20 is a platform 40 fixed in the assembly frame 16 and carrying a reversible motor 42 which drives through a gear reducer 44 to a worm and worm gear unit 46 fixed by a bracket 60 to frame assembly 16. A short shaft 48 extends out both directions from unit 46. The structure is such that when the motor 42 is rotated in one direction or the other the gear reducer 44 drives the worm in unit 46 to turn the worm gear or unit 46 which is secured to the shaft 48 so that the shaft 48 is slowly rotated.

Figure 2:
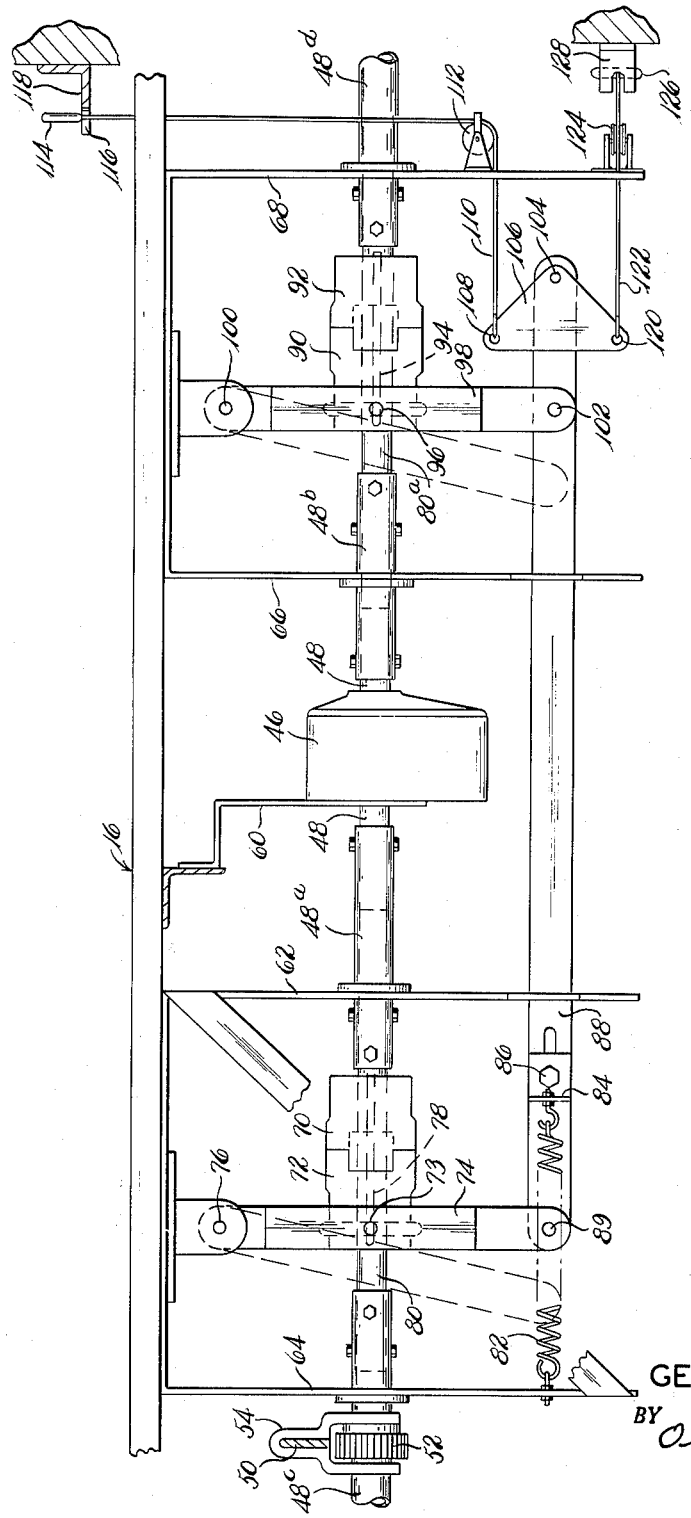
FIGURE 2 is a fragmentary view taken substantially on line 2—2 of FIGURE 1 and illustrating the details of the quick release mechanism.

As best seen in FIGURE 2, secured to the short shaft 48 are tubular extensions 48a and 48b fastened to clutches 70–72 and 90–92, which in turn are secured to tubular shafts 48c and 48d which extend substantially the full length of the frame assembly 16. Now mounted at spaced points along the tubular shafts 48c and 48d are rack and gear units, the numeral 50 indicating the rack and the numeral 52 indicating the gear secured to the shafts 48c and 48d. The rack 50 extends slidably through a guide 54 which holds the rack in operative engagement with the gear 52 so that as the shaft 48c or 48d rotates the rack 50 moves up and down. The upper end of each rack 50 is pivotally secured at 56 to the damper 20, and a fusible link 58 is normally interposed between the end of the rack 50 and the pivotal connection 56.

Referring still to FIGURE 2 of the drawings, the frame assembly 16 not only mounts worm gear unit 46 on bracket 60 but also carries plates 62, 64, 66 and 68 which serve to journal the tubular extensions 48a and 48b and the tubular shafts 48c and 48d. The clutch 70–72 has jaw 70 fixed to tubular extension 48a and jaw 72 pivotally carried in sliding bearings 73 by a yoke assembly 74 pivoted at 76 to frame 16. The jaw 72 of the coupling is splined at 78 to a stub shaft 80 connected to tubular shaft 48c. Thus, swinging movement of the yoke assembly 74 from the full line position shown to the dotted line position disengages the jaw 72 from the jaw 70. The yoke assembly 74 is normally urged to the dotted line position by means of a tension spring 82 extending between the plate 64 and a bracket 84 adjustably secured by bolt 86 to a link 88 slidably mounted in plates 62 and 66. The link 88 is pivotally connected at 89 with yoke assembly 74.

The tubular shaft 48c is illustrated at the left hand side of FIGURE 2 as having a gear 52 splined thereto, the gear 52 being in engagement with rack 50, the rack being slidably held in such engagement by means of guide 54 rotatably mounted upon tubular shaft 48c. A similar rack and gear unit 50–52 is mounted on the tubular shaft for each damper to be handled.

The tubular extension 48b to the right hand side of the worm gear unit 46 is secured to jaw 90 of clutch 90–92 and the cooperating jaw 92 secured to tubular shaft 48d which extends in the opposite direction in the frame assembly 16 to control the operation of the dampers towards the other end of the frame assembly. The tubular shaft 48d is provided with a gear 52 and associated rack 50 for each damper to be serviced by the shaft 48d. The jaw 90 of the clutch is splined at 94 to a stub shaft 80a secured to the tubular extension 48b, and is pivotally carried in sliding bearings 96 in yoke assembly 98 which is pivotally secured at 100 to a portion of the frame assembly 16. Thus movement of the yoke assembly 98 from the full line to the dotted line position disengages jaw 90 from jaw 92 to disconnect the tubular shaft 48d. The end of the yoke assembly 98 is pivotally secured at 102 to the link 88 so that the clutch 90–92 like clutch 70–72 is normally urged to disengaged position by means of the tension spring 82.

Pivotally secured at 104 to the link 88 is a bar 106 which has secured to one end at 108 a flexible strand means 110, such as a cable or chain which extends over suitable guide pulleys 112 to a position on the roof of the building. The end of the strand means 110 is releasably locked on the roof of the building, as by providing a ring 114 releasably carried behind a slot 116 in a bracket 118 fixed to the roof of the building. The arrangement is such that the flexible strand means 110 is normally locked behind the bracket 118, but can be quickly pulled off of the bracket 118 to release the flexible strand means in the event the dampers are to be opened rapidly, as in case of fire.

The other end of the bar 106 is also provided at 120 with a flexible strand means 122, such as a chain or cable which extends over one or more pulleys 124 and down to a position inside a building where the strand means 122 has its end appropriately anchored. This, as previously described, may be accomplished by securing the end of the strand means 122 to a ring 126 which is releasably positioned behind a bracket 128 fixed to the inside of the building and having an appropriate slot through which the flexible strand means extends.

In the operation of the apparatus, with the parts shown in the solid line position of FIGURE 2 the motor 42 can be driven forward or back to adjustably open or fully close the dampers 20. The motor 42 operates through the gear reducer 44 and the worm and worm gear unit 46 to drive through the clutches 70–72 and 90–92 to simultaneously rotate tubular shafts 48c and 48d. The rotation of these shafts operate through gear means 52 and racks 50 to open or close the dampers 20 as desired by the operator.

Should a fire start in the building containing the dampers and it becomes desirable to open all of the dampers simultaneously then it is a very simple matter for a fireman or other operator to release the dampers from either the roof of the building or from inside the building. To do this either the ring 114 or the ring 126 is pulled from behind its stop bracket and released. This allows lever 106 to tilt permitting the link 88 to be drawn to the left of FIGURE 2 by means of the tension spring 82. This moves yoke assemblies 74 and 98 to the dotted line positions to open clutches 70–72 and 90–92. The opening of these clutches then allows each damper 20 to swing about its pivotal supports 24 and to move to the dotted line position, i.e. vertical position shown in FIGURE 1 under the force of gravity upon each damper. During such movement of each damper the racks 50 will rotate the gears 52 to rotate the tubular shafts 48c and 48d. But the complete operation is very rapid requiring only between about one and about three seconds time from the release of either flexible strand means 110 or flexible strand means 122 until all of the dampers in the entire row are standing completely vertical and open.

While one best known embodiment of the apparatus has been illustrated and described in detail, it is to be particularly understood that the invention is not to be limited thereto or thereby, but that the scope is defined in the appended claims.

What is claimed is:

1. In a large damper assembly adapted to be positioned in long runs on top of a building roof the combination of a substantially rectangular frame, a plurality of dampers pivotally mounted in the frame on horizontal axes positioned slightly off center so that each damper will move by gravity to a substantially vertical open position, a plurality of rack and gear means for moving each damper to an adjusted or closed substantially horizontal position, a plurality of shafts each mounting a portion of the gear means, a motor, a gear reducer connected to the motor and to at least one of the shafts, a plurality of clutches interconnecting the end of the shafts, mechanical linkage connecting the clutches for simultaneous operation, spring means biasing the linkage and tending to open all clutches, an elongated bar pivotally secured at its center to the linkage, flexible strand means secured to one end of the bar and adapted to extend to a roof and adapted to be releasably anchored there to urge the linkage to close all clutches, and a second flexible strand means secured to the other end of the bar and adapted to extend to the inside of a building and adapted to be releasably anchored there to urge the linkage to close all clutches, whereby release of either strand means allows the bar to pivot so the spring means moves the linkage which disengages all clutches and causes all dampers to move to open position by gravity.

2. In a large damper assembly adapted to be positioned in long runs on top of a building roof the combination of a substantially rectangular frame, a plurality of dampers pivotally mounted in the frame on horizontal axes positioned slightly off center so that each damper will move by gravity to a substantially vertical open position, rack and gear means for moving each damper to an adjusted or closed substantially horizontal position, a shaft mounting the gear means, a motor, a gear reducer connected to the motor, a clutch between the shaft and the gear reducer, mechanical linkage connected to the clutch, spring means biasing the linkage and tending to open the clutch, pivotal means secured to the linkage, flexible strand means secured to the pivotal means and adapted to extend to a roof and adapted to be releasably anchored there to urge the linkage to close the clutch, and a second flexible strand means secured to the pivotal means and adapted to extend to the inside of a building and adapted to be releasably anchored there to urge the linkage to close the clutch whereby release of either strand means causes the pivotal means to rotate thereby effecting a slackness in the other strand means which disengages all clutches and causes all dampers to move to open position by gravity.

3. The combination in a large damper assembly adapted to be positioned in long runs on top of a building roof of, a frame, a plurality of dampers pivotally mounted in the frame on horizontal axes positioned slightly off center so that each damper will move by gravity to a substantially vertical open position, means for moving each damper to an adjusted or closed substantially horizontal position, a plurality of shafts mounting the damper moving means, a motor, a clutch between each shaft and the motor, mechanical linkage connecting the clutches for simultaneous operation, spring means biasing the linkage and tending to open all clutches, flexible strand means secured to the linkage and adapted to extend to a roof and adapted to be releasably anchored there to urge the linkage to close all clutches, and a second flexible strand means secured to the linkage and adapted to extend to the inside of a building and adapted to be releasably anchored there to urge the linkage to close all clutches whereby release of either strand means causes the other strand means to be released which disengages all clutches and causes all dampers to move to open position by gravity.

4. In a large damper assembly adapted to be positioned in long runs on top of a building roof the combination of a substantially rectangular frame, a plurality of dampers pivotally mounted in the frame on horizontal axes positioned slightly off center so that each damper will move by gravity to a substantially vertical open position, rack and gear means for moving each respective damper to an adjusted substantial horizontal closed position, a plurality of shafts mounting the gear means, a plurality of clutches interconnecting the ends of the shafts, means to drive the clutches, mechanical linkage connecting the clutches for simultaneous operation, spring means biasing the linkage in a direction to open all clutches, an elongated bar pivotally secured at its center to the linkage, flexible strand means secured at each end of the bar holding the bar essentially perpendicular to the linkage and holding the linkage against the bias of the spring means to close all clutches, the flexible strand from one end of the bar extending to a roof and adapted to be releasably anchored there, and the flexible strand means from the other end of the bar extending to the inside of a building and adapted to be releasably anchored there whereby release of either strand means allows the bar to pivot toward a position essentially parallel to the linkage so the spring means moves the linkage which disengages all clutches and causes all dampers to move to the open position by the force of gravity.

References Cited by the Examiner

UNITED STATES PATENTS 2,814,979   12/57   Johnson _____ 98—42

ROBERT A. O'LEARY, *Primary Examiner.*